Sept. 5, 1967 W. TOTO 3,340,346
TERMINAL FOR A SPIRAL WOUND KICKLESS WATER-COOLED
WELDING CABLE AND METHOD OF MAKING THE SAME
Filed Dec. 13, 1966 4 Sheets-Sheet 1
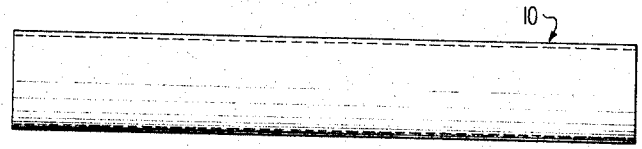
FIG.1
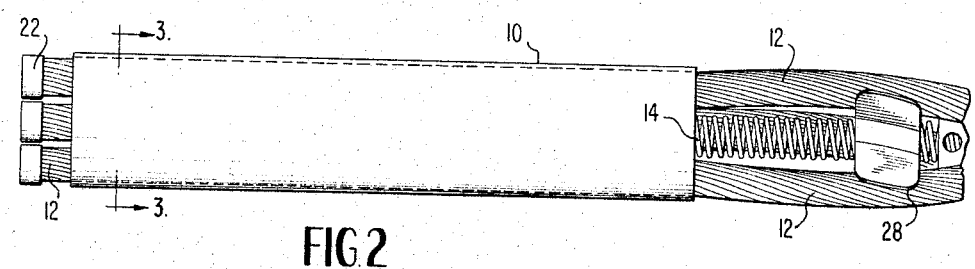
FIG.2
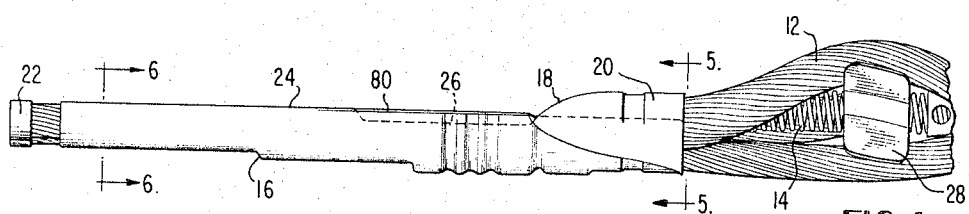
FIG.4
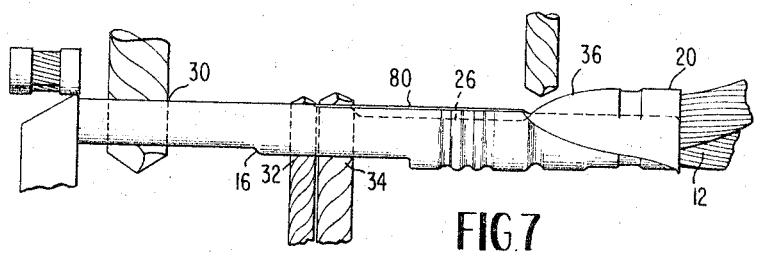
FIG.7  FIG.6
FIG.5
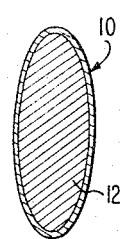
FIG.3
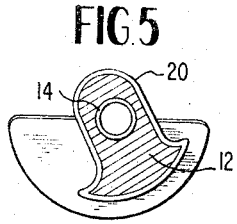
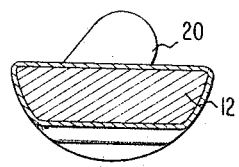
INVENTOR
WILLIAM A. TOTO
BY
Abraham A. Saffitz
ATTORNEY Sept. 5, 1967  W. TOTO  3,340,346
TERMINAL FOR A SPIRAL WOUND KICKLESS WATER-COOLED
WELDING CABLE AND METHOD OF MAKING THE SAME
Filed Dec. 13, 1966  4 Sheets-Sheet 2
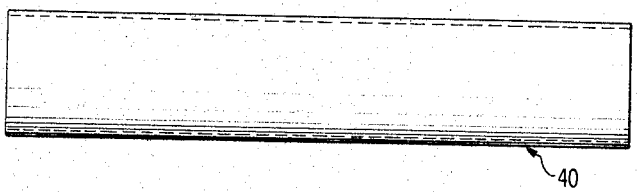
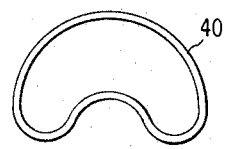
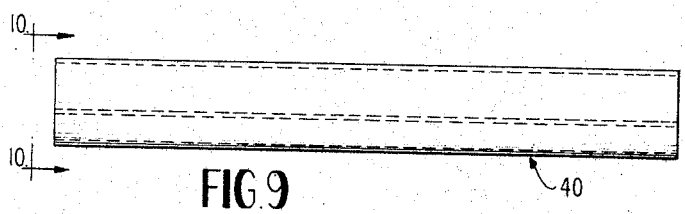
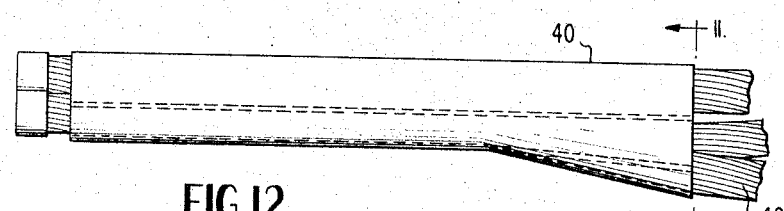
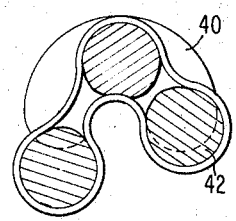
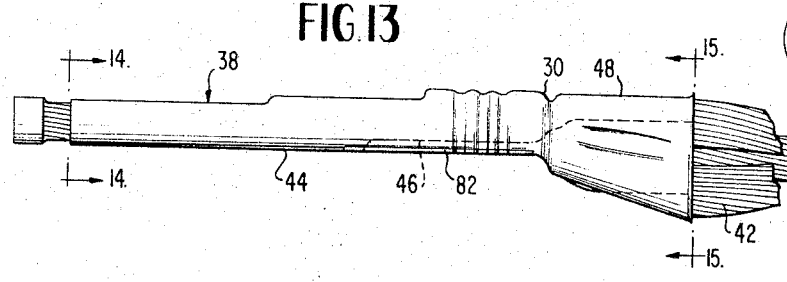
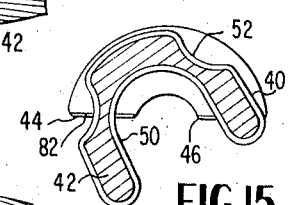
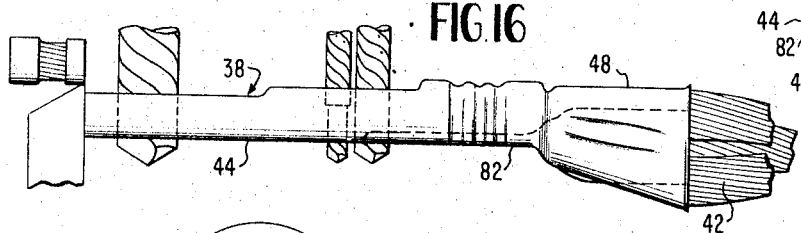
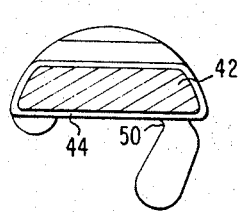
INVENTOR
WILLIAM A. TOTO
BY
Abraham A. Saffitz
ATTORNEY

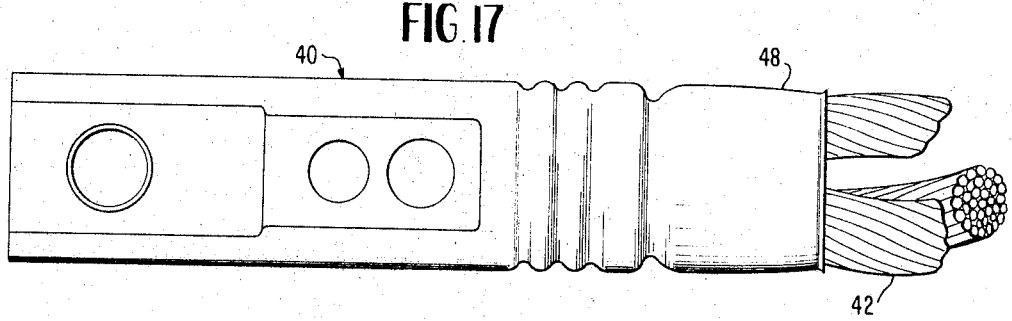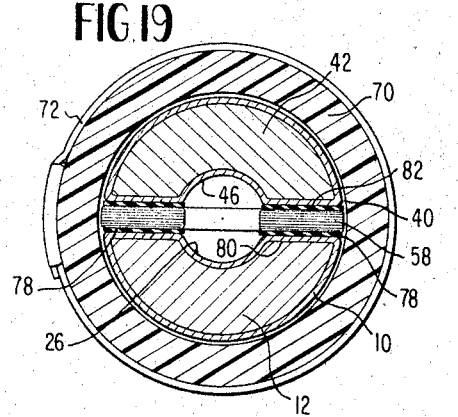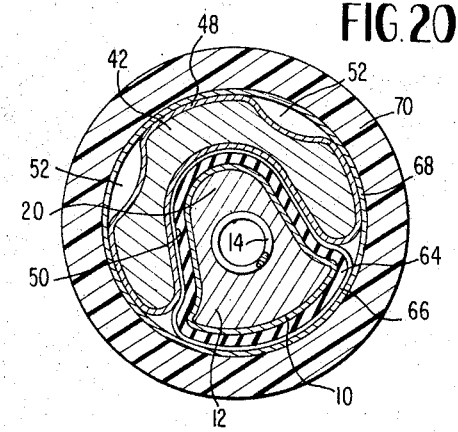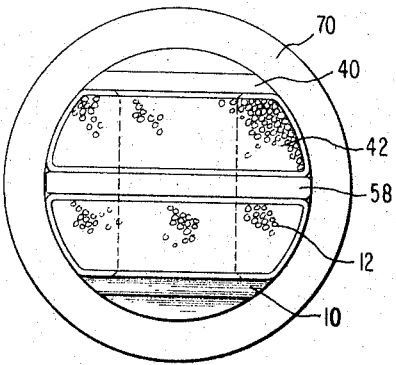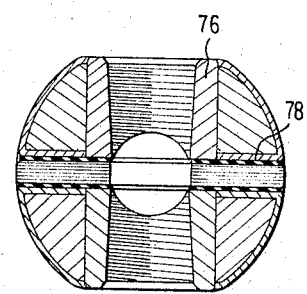

Sept. 5, 1967 W. TOTO 3,340,346
TERMINAL FOR A SPIRAL WOUND KICKLESS WATER-COOLED
WELDING CABLE AND METHOD OF MAKING THE SAME
Filed Dec. 13, 1966 4 Sheets-Sheet 4
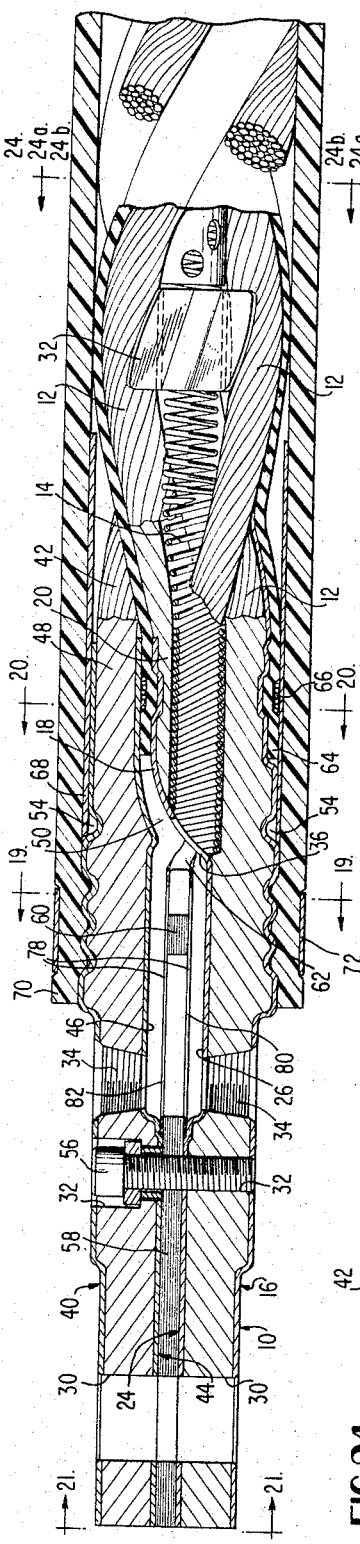
INVENTOR
WILLIAM A. TOTO
BY
Abraham A. Saffitz
ATTORNEY

United States Patent Office 3,340,346
Patented Sept. 5, 1967

3,340,346
TERMINAL FOR A SPIRAL WOUND KICKLESS WATER - COOLED WELDING CABLE AND METHOD OF MAKING THE SAME
William Toto, 3645 Warrensville Center Road, Cleveland, Ohio 44122
Filed Dec. 13, 1966, Ser. No. 601,361
12 Claims. (Cl. 174—15)

ABSTRACT OF THE DISCLOSURE

A terminal structure for a spirally wound, kickless welding cable comprising groups of conductor strands of opposite alternating polarity, each within a tubular insulated covering, the forward end of each of the groups joining in a longitudinal swaged tongue and groove connection, wherein the half-terminal in the shape of the tongue includes a spring conduit for cooling water which terminates in an orifice at the forward part of the tongue and the grooved half of the terminal interfits with and surrounds the tongue, and wherein the terminal structure is provided with inlet fittings for introducing cooling water into the terminal to bathe both groups of conductors throughout the length of the cable and an insulating, heat-resistant separator member for each group which separates the conductor strands and provides internal support adjacent the swaged end.

---

This invention relates to a water cooled welding cable terminal assembly and its method of manufacture.

The terminal embodied by this invention is intended for use with a kickless type cable of the type described in U.S. Patent No. 2,308,673, issued to L. S. Burgett. This type of cable is well known in the art and comprises, for a double polarity system, two groups of conductor strands wound about themselves along the cable length, with each group being mutually electrically insulated from the other by a suitable insulating material. The entire cable assembly is enclosed in an outer sheath and cooling water is circulated throughout the cable length.

The present invention provides a terminal assembly similar in style and function to the terminal shown by U.S. Patent No. 3,127,467, issued to the present inventor on Mar. 31, 1964. The terminal constituting the subject matter of that patent comprised a pair of solid, machined, semicylindrical conductor elements joined along their flat surfaces with insulation disposed between them, and further having specific structure at their cable joined ends for enabling a unique cable to terminal joint to be formed while preserving an overall compact profile.

This invention substitutes a novel terminal assembly for the terminal shown by the present inventor's earlier patent hereinbefore referred to, and generally, the terminal of the present invention is a simplified, less expensive, more easily formed terminal, and yet is just as rugged, electrically efficient, and serviceable as the earlier terminal.

Generally, the present terminal comprises a pair of terminal halves that are formed by swaging or pressing a group of cable conductors of single polarity within an outer conductive tube, the final swaged form of each of the tubes with its enclosed cable conductor elements enabling both halves to be joined together along a mutually insulated interface with provision being made for coolant supply and flow to the cable interior, and with the outer contour of the assembled terminal being substantially the same as the earlier patented terminal.

In welding cable assemblies, the terminal to cable joint is critical insofar as serviceability and dependability are concerned, and the present invention contemplates forming the rearward ends of the terminal halves in a unique manner for accomplishing the transition from terminal to cable structure, wherein the cable conductors extend through the terminal halves when the cable ends are enclosed in the tubes and subsequently formed with the tubes to provide the resultant terminal.

Accordingly, the rearward sections of the terminal halves are formed so that a structurally sound tongue and groove joint is effected when the terminal halves are assembled with each other, with insulation means separating the tongue and groove sections. Thus, one group of cable strands extends through the tongue section and another group extends through the groove section, with the outer contours of both tongue and groove sections forming a generally cylindrical cross section when the terminal halves are assembled. The tongue section of the terminal assembly is formed so as to contain a coolant conduit. Also, both terminal halves have a central complementary longitudinal channel or groove formed on their flat sides which are to be joined together in abutting relationship so that when so joined, a central cooling water channel is provided within the terminal assembly, the channel communicates with the water supply port of the terminal and with the conduit in the tongue section of the terminal through an aperture in the tongue section. Cooling water is supplied to the entire cable through this means and by means of suitable openings between terminal halves which have been designed for the purpose.

An object of this invention is to provide a water cooled welding cable terminal assembly.

Another object is to provide a method of making a water cooled welding cable terminal assembly.

Another object is to provide a water cooled welding cable terminal assembly wherein the cable to terminal joint is mechanically sound and electrically efficient.

Another object is to provide a welding cable terminal which is formed quickly and simply by swaging a group of cable conductors within a conductive tube.

Another object is to provide a welding cable terminal assembly having a channel for passage of a coolant therethrough.

Another object is to provide a welding cable terminal assembly wherein the cable conductors extend through the terminal halves.

Another object is to provide a welding cable terminal that is economical to make and of efficient design.

These and other objects and novel features of the present invention will be more clearly and fully set forth in the following specification, attached drawings and claims. A preferred embodiment of this invention of an improved water cooled welding cable terminal assembly and the method of manufacturing the same will now be described with particular reference to the accompanying drawings wherein:

FIGURES 1-7 depict the assembly and forming operations for one of the terminal halves embodied by the present invention;

FIGURES 8-17 depict the assembly and forming operations on the other terminal half;

FIGURE 18 is an elevational, longitudinal sectional view of the assembled terminal of the invention;

FIGURES 19-21 are sectional views taken along sections in FIGURE 18;

FIGURE 22 illustrates an alternate method of forming threaded openings for receiving fittings in the terminal;

FIGURE 23 is a view taken along line 23—23 of FIGURE 22;

FIGURE 24 is a view taken along line 24—24 of FIGURE 18 and represents the conventional six conductor alternating polarity cable configuration; and FIGURES 24a and 24b are taken along line 24—24 of FIGURE 18 and represent alternate cable configurations of four conductor alternating polarity.

Referring now to FIGURES 1 through 7, a substantially cylindrical tubular blank 10 is shown in FIGURE 1. In forming a terminal half, the tube 10 is first deformed to an elliptical shape, as shown in FIGURE 3, and the conductor strands 12 of one polarity group of cable conductors is inserted therein along with a coil spring-type water coolant distributing conduit 14 which is inserted only partially through the rearward end of the tube 10, normally only to the extent that a tongue portion 20 of the terminal half 16 will extend, as will be more specifically described below. As is conventional with kickless cables, it is desirable to supply water coolant throughout both polarity sets of conductor strands and the water distributing conduit 14 is used in this instance to supply water to those strands 12 which are to be enclosed within sheath 10 and which will be formed into the tongue section in the terminal half 16.

It is to be understood throughout this description that the term "forward," when used in connection with the terminal assembly, refers to that end of the terminal away from the end where the terminal joins the cable, and that "rearward" is used to denote the end of the terminal towards the cable.

As shown in FIGURE 4, the assembled and formed tube 10, which now forms a sheath over the ends of the cable conductor strands 12 and spring conduit 14, are then pressed or swaged to form the terminal workpiece 16 to the desired final contour, including a substantially rectangular forward end, as shown in FIGURE 6, and a rearward end which has been formed to provide a tongue portion 20 (see FIGURE 5). The transverse axis of symmetry of the tongue 20 is inclined about 30 degrees with respect to the transverse axes of symmetry of the rest of the terminal structure to smoothly and evenly receive the cable conductors since they are spiralled along the cable axis, and to serve as a transitional area for the cable as it becomes a part of the terminal. Moreover, the shape of the tongue element 20 enables the spring conduit 14 to extend centrally through this portion of the terminal assembly without interference. The tongue 20 extends longitudinally of the terminal half 16 only for a predetermined distance and is paired with the remaining terminal structure at a sloping forward wall section 18, the inner spring conduit 14 extending longitudinally within the tongue 20 up to the wall section 18.

Other features of the contour characteristics of the terminal half 16 are a flat surface 24 which is to eventually abut the opposite terminal half, a coolant supply channel 26 which extends from about midway the terminal rearwardly to the forward wall 18 of the tongue section 20, and partially around the tongue section. Channel 26 is formed by a depression in surface 24 between the flat wall portions 80 (FIGS. 5 and 19). As is conventional with terminal assemblies of this type, the rearward peripheral portion of the terminal element is contoured to a semicylindrical shape (see FIGURES 5 and 6). The tongue 20, it will be noted from FIGURE 6, extends transversely in a direction substantially normal to the plane surface 24 in a radially inwardly direction.

It will be readily appreciated that the pressing and forming operations of the tube 10 and cable conductors 12 produce a relatively dense, homogeneous structure of conductive strands within an outer conductive sheath. If desired, the electrical and structural properties of the so-formed terminal 16 may be further enhanced by dipping the forward portion of the same in molten solder so that the fused metal penetrates the cable strand interstices and forms a relatively solid, unitary structure from the cable and tube assembly. The dipping step is preferably done between intermediate pressing operations.

It will be further noted from FIGURES 2 and 4 that in the normal assembly, a portion 22 of the cable conductor 12 extends beyond the forward end of the tube 10. The portion 22, as shown in FIGURE 7, is removed by a conventional cutting tool with a portion of the tube 10 to bring the terminal 16 to its desired length. This method of forming the terminal has the inherent advantage that no critical length of tube blank 10 and cable end portion 22 must be determined in advance to take into account the elongation of the assembly during the deforming operation, and enables the final dimensioning of the terminal 16 after the swaging operation.

Element 28 in FIGURES 2 and 3 is a relatively rigid, non-conductive spacer element for maintaining the relative positions of the cable strands 12 prior to their entrance into the tube 10 and prevents friction and wear between the conductors 12 and the coil spring water conduit 14 in this area. FIGURE 7 shows schematically how the terminal half 16 is finally formed by cutting the length to size, drilling a hole at 30 for a transformer or welding tool connection, drilling and tapping a hole at 32 and 34 for a fastener and threaded cooling water hose connections, and drilling a hole at 36 in the forward wall of the tongue 20 for establishing communication betwen channel 26 and spring conduit means 14 disposed within the tongue 20.

Referring now to FIGURES 8 through 17, which depict the forming of another terminal half 38, a cylindrical tube blank 40 is preferably deformed to a substantially kidney shape in transverse cross section, as shown by FIGURE 10, and then the rearward portion thereof is fluted, as shown in FIGURE 11, in preparation for insertion of cable conductors 42 of opposite polarity to conductors 12. After insertion of conductors 42 through tube 40, a pressing, swaging, or forging type operation forms the terminal half 38, shown in FIGURES 13, 14 and 15.

The terminal half 38 also features a forward section that substantially matches the forward portion of the terminal half 16, including a flat surface 44 which is to eventually abut surface 24 of terminal half 16 and a channel 46 which will cooperate with the channel 26 to form a coolant conduit in the assembled terminal, and further includes a semi-cylindrical portion so that a full cylindrical cross section is presented by the joined halves at their rearward regions. Channel 46, like channel 26, is formed by a depression in surface 44 between the flat wall surfaces 82 (FIG. 19).

The primary distinguishing feature of the terminal half 38 is the shape of the rearward end 48 which is contoured so as to present a groove 50 which can accommodate the radially inward portion of tongue 20 of terminal half 16 when terminal half 38 is joined therewith. Sufficient space is provided between the tongue 20 and the groove 50 for enabling an insulating material to electrically separate the tongue and groove sections 20 and 50.

It will be noted from FIGURE 15 that the symmetrical axes of the groove 50 are inclined with respect to the symmetrical axes of the forward terminal section in order to coincide with the inclination of the tongue 20 and to better accommodate the spirally wound cable conductors 42. It will be further noted from FIGURE 15 that the conductor elements 42 occupy substantially all of the space within the deformed wall sections of tube 40 so as to form a relatively solid, conductive section of terminal in this area as well as in the forward area where the same dense, compact cable strands fill the formed tube blank 40.

The coolant channel 46 communicates with the groove area 50 to supply water to the cable strands 42 in a manner which will become more apparent below, and channels 52 and 54 (the latter being provided at the rearward end of both terminal halves 16 and 38) are also provided in the rearward section 48 to further provide a supply of cooling water to cable strands 42, as will be apparent below.

FIGURE 18 shows the finally assembled terminal incorporating the terminal halves 16 and 38 formed according to the manner described above and shown in FIGURES 1-17. The terminal halves 16 and 38 are joined along their flat surfaces 24 and 44 in abutting relationship but separated by electrical insulation 58, which extends across the full interface between the forward portions of the terminal halves 16 and 38 almost up to the front face section 18 of tongue 20, except for the water channel portions 26 and 46 of the terminal assembly which is left substantially free of insulation. As shown in FIGS. 18 and 19, the portion of insulation 58 straddling water channels 26 and 46 is located between flat wall portions 80 and 82. Packing or sealing strips 78, made of a heat-resistant, sealing material, are inserted between portions 80, 82 and insulation 57 to provide a water-tight joint. If desired, reinforcing sections of insulation, such as at 60, may extend diametrically across the channels 26 and 46. An opening or clearance 62 is left between the terminal halves 16 and 38 at the rearward sections thereof near the forward end 18 of the tongue section 20, which opening communicates with groove or channel 54 whereby communication is established between channels 26-46 and the cable strands 42 by way of clearance space 62 and the channels 52 and 54, all of which are in communication for allowing continuous flow of cooling water therethrough. Channel 26-46 is also in communication with cable strands 12 by way of opening 36 and conduit 14 in tongue section 20 of the terminal 16. It is thus apparent that cooling water flowing through ports means 62, 50 and 36 in the terminal is circulated throughout the cable cross section in the same manner as occurs in the terminal of Patent No. 3,127,467, and the cooling effect is also applied to the terminal structure itself.

In assembling the terminal, the internal cable insulators sheath 64 and 64a, separating conductor strands 12 and 42 as shown in FIGURES 24 and 24a, which had been pulled back during the terminal forming operation when the tubes and strands were joined and shaped, is wrapped around tongue section 20 and held in place by a wrapping 66.

A variation of the four conductor alternating polarity cable construction is shown in FIGURE 24b, using a cruciform separator 64b instead of the curved envelope sheath type 64. In this construction, the sheath is notched in the area of the core behind the conductor 20 allowing conductors 12b to join at a common point shown in FIGURE 5. Conductors 42b can now straddle them at this point and enter the rear portion of connector 48, as seen in FIGURE 15.

After putting the terminal parts together, the terminal halves 16 and 38 are joined together as shown and are held in position by a suitable fastener 56. A relatively rigid, cylindrical, nonconductive tube 68 is placed about the rearward terminal section to rigidly hold the terminal halves 16 and 38 together in this area to provide a smooth outer contour in the cable to terminal joint area, and to aid in resisting bending stresses and fatigue at the cable to terminal joint. Finally an outer cable sheath 70 is pulled over the rearward terminal section and held in place by means of a suitable band 72.

FIGURES 22 and 23 show an alternate embodiment of the terminal wherein the openings 32 and 34, previously formed, are provided with solid conductive insert elements 74, 76 which are soldered to the internal bore walls of the apertures 32 and 34 to provide rigid, accurate, and wear-resistant thread sections for the fastener 56 and cooling water hose connections (not shown).

It is to be understood that only one terminal assembly has been described and that normally, as pointed out and shown in the inventor's previous patent referred to above, a terminal is attached to both of the ends of a welding cable, and cooling water is supplied at one terminal end and flows out of the other. The words "supply ports" and "coolant supply channels" and the like, therefore, must also be taken to be inclusive of coolant removal ports or coolant removal channels, depending, of course, on which way the coolant is flowing through the terminal.

I claim:

1. A terminal structure for a spiral wound kickless welding cable including two mutually insulated groups of multiple equal numbered conductor strands of opposite and alternating polarity with a tubular covering, said terminal comprising a pair of terminal halves, the first half comprising a unitary elongated hollow conducting sheath having a forward portion with an outer flat surface and an expanded rear portion to provide a longitudinal tongue section, a depression in the flat surface to form a water channel terminating adjacent the forward formation of the tongue section, the second half of the terminal comprising a unitary elongated hollow conducting sheath having a flat outer surface and depression therein corresponding to the surface and depression of the first sheath, and having an expanded rear portion to provide a longitudinal outer groove section complementary in form to the tongue section to interfit therewith, electrical insulating means interposed between said halves along said outer flat surfaces, an opening in the insulating means at the region where the depressions mate, means joining said halves and interposed insulation to provide a unitary terminal structure with a water channel therein, the ends of the conductor strands of one group entering the first sheath at the expanded rear tongue portion and passing out at the forward end of the sheath, the ends of the conductor strands of the second group entering the second sheath at the expanded rear groove portion and passing out at the forward end of the sheath, the sheaths being sized to forcibly embrace the strands so as to form a strong mechanical and electrical connection therewith.

2. A terminal structure in accordance with claim 1, wherein the transverse axes of symmetry of said tongue and groove sections are inclined at an angle of approximately 30° with respect to the transverse axes of symmetry of the forward portions of the terminal halves, this angle being approximately equal to the angle of the cable helix and the direction of inclination corresponding to the direction of winding of the kickless cable conductor strands.

3. A terminal structure in accordance with claim 1 wherein the insulating separators of a four conductor alternating polarity cable are mutually insulated by a flexible cruciform insulating means throughout the length of the cable with the arms of the cruciform extending to the inner surface of the outer covering of said cable.

4. A terminal structure in accordance with claim 1 wherein the insulating separator of a four conductor alternating polarity cable is a flexible tubular covering containing two strands of the same polarity and a hollow core, thereby insulating the same from the remaining two strands of opposite polarity.

5. A terminal structure in accordance with claim 1 wherein two resilient heat resistant strips are placed on either side of the opening in the insulating means at the depressions of said terminal halves in order to achieve an effective means of preventing coolant leakage between the terminal halves.

6. The terminal structure in accordance with claim 1, wherein each group includes three conductors, a tubular covering for said groups, a water distributing conduit within said tubular covering and extending the length of the cable, the terminal of the water conduit terminating in the tongue section, and an orifice in the tongue section permitting communication between the water channel formation and water conduit, the rear portion of the terminal structure presenting a region of cylindrical cross section for accommodating the tubular covering in a water-tight manner about the outer surface of the terminal structure.

7. A terminal structure in accordance with claim 6 wherein said cable is of the type requiring separate water supplies to each group of conductors, said cable water distributing conduit constituting the water supply means for the first group and the additional features of a clearance passage between areas of the tongue and groove sections, an outer circumferential channel and longitudinal outer channels in the rearward portion of said other terminal half including the groove section, said clearance passage, outer circumferential groove and outer longitudinal channels being in communication with each other and with said inner terminal water supply channel for supplying water to the second group of cable strands.

8. A terminal structure in accordance with claim 6, wherein a flow restricting and deflecting member is placed in the water conduit to said the distribution of water along the length of the cable.

9. A method of forming terminal halves of a two-piece cylindrical terminal of a double polarity, kickless, welding cable from free ends of cable conductor strands and a pair of conductive tubular blanks, comprising forming the first terminal half by passing the free ends of the cable conductor strands of one polarity through one tubular blank, progressively pressing said cable ends and said blank to thereby form a dense, homogeneous core of cable strands within a conductive sheath, forming a longitudinal tongue section at the rearward end of said blank and the strands therein, the final pressed above terminal half structure possessing the desired terminal outer contours and a flat, axially extending inner surface at its forward portion, with said tongue section disposed transversely of the plane including said flat surface; and forming the second half of said terminal by passing the free ends of the cable conductor strands through the other tubular blank to form a similar core of strands within a conductive sheath, and forming a longitudinal groove section at the rearward end of said blank and the strands therein, the second terminal half also possessing in its final form, a desired outer terminal contour and a flat, axially extending inner surface at its forward portion, the internal contours of said groove section being complementary in shape to the external contour of that contour of that portion of said tongue section intended to mate with said groove section in the final terminal assembly.

10. A method in accordance with claim 9, wherein said welding cable is a water-cooled type requiring a water supply to each polarity group of cable conductors and including a water distributing conduit within the cable associated with one polarity group of cable strands, the additional steps of forming water supply ports in the central area of each pressed terminal half, forming an axially extending channel in the flat inner surface of each terminal half, the channels being in communication with the ports, placing the free end of the cable water distributing conduit within that section of the first terminal half that is to be formed into the tongue section of that half before the first half is formed, forming said tongue section so as to enclose the cable water conduit centrally therein and surrounded by compressed cable strand material, and finally cutting an aperture in the forward end of said tongue section to enable communication between the axial water channel in the first terminal half and the cable water distributing conduit in the tongue section of the second terminal half.

11. A method in accordance with claim 9, including the step of dipping the forward area of the formed terminal halves into fused metal after the press-forming operation to unify the cable strands and the conductive sheath.

12. A method in accordance with claim 9, including the steps of drilling apertures in the central portions of the formed terminal halves and thereafter placing and securing tapped insert plugs within said apertures for providing terminal fastener and water supply port connections.

References Cited

UNITED STATES PATENTS

| | | | |
|---|---|---|---|
| 2,702,311 | 2/1955 | Botterill et al. | 174—19 |
| 3,127,467 | 3/1964 | Toto | 174—15 |
| 3,163,704 | 12/1964 | Leathers | 174—15 |

LEWIS H. MYERS, *Primary Examiner.*

H. HUBERFELD, *Assistant Examiner.*